No. 12,770. REISSUED MAR. 31, 1908.

H. T. BROWN.

COLLAPSIBLE BOX.

APPLICATION FILED FEB. 26, 1908.

2 SHEETS—SHEET 1.

Witnesses:

Robt R Kitchel

Jos. J. Dennis Jr.

Inventor:

Henry T. Brown,

By Charles N. Butler, Atty

THE MORRIS PETERS CO., WASHINGTON, D. C.

No. 12,770. REISSUED MAR. 31, 1908.

H. T. BROWN.

COLLAPSIBLE BOX.

APPLICATION FILED FEB. 26, 1908.

2 SHEETS—SHEET 2.

Witnesses:

Robt R Kitchel

Jos. G. Denny Jr

Inventor:

Henry T. Brown

By Charles N. Butler, Atty.

THE NORRIS PETERS CO., WASHINGTON, D. C.

UNITED STATES PATENT OFFICE.

HENRY TATNALL BROWN, OF MOORESTOWN, NEW JERSEY, ASSIGNOR TO BROWN & BAILEY COMPANY, OF PHILADELPHIA, PENNSYLVANIA, A CORPORATION OF PENNSYLVANIA.

COLLAPSIBLE BOX.

No. 12,770. Specification of Reissued Letters Patent. Reissued Mar. 31, 1908.

Original No. 875,409, dated December 31, 1907, Serial No. 291,989. Application for reissue filed February 26, 1908. Serial No. 418,085.

*To all whom it may concern:*

Be it known that I, HENRY TATNALL BROWN, a citizen of the United States, and a resident of Moorestown, in the county of Burlington and State of New Jersey, have invented certain Improvements in Collapsible Boxes, of which the following is a specification.

This invention relates to improvements in collapsible paper boxes adapted for use as pail fillers. Its characteristic features comprise the capacity to collapse into quadrilateral form having the compass of a single side of the box, to open for use from the initial collapsed position without breaking or creasing to form joints along scores or otherwise, to provide an unbroken folding bottom that is effectively supported and braces the collapsible sides when the parts are in position for use, to reduce the number of glue laps, and to provide a more efficient and convenient construction at reduced cost.

Figure 1:
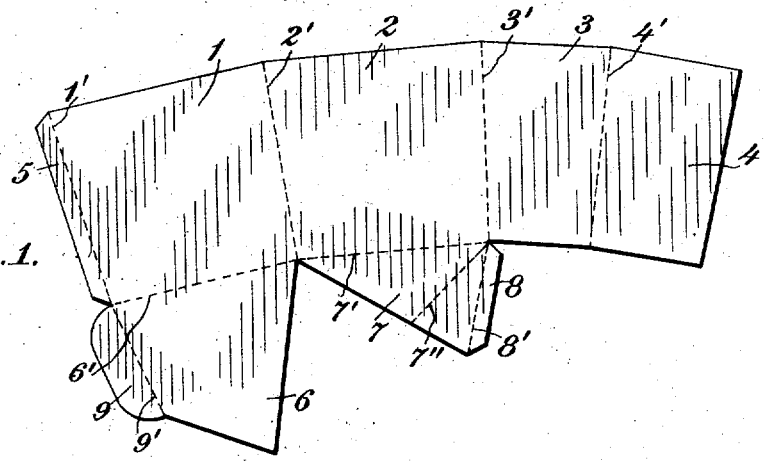
Figure 5:
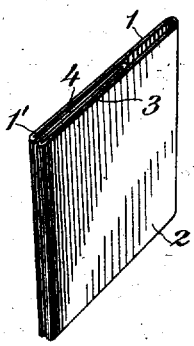
Figure 4:
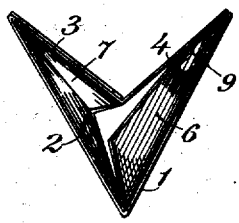
Figure 3:
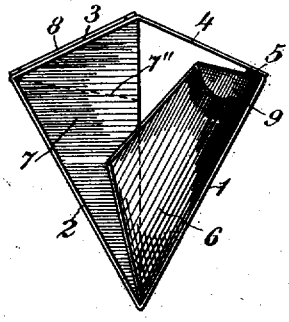
Figure 2:
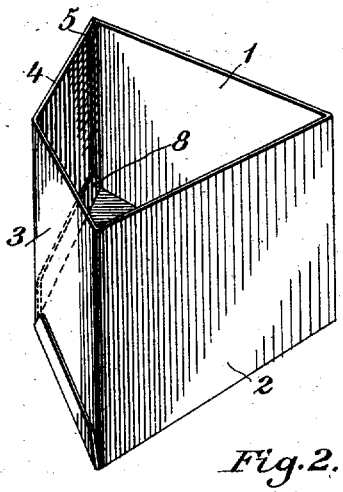
Figure 6:
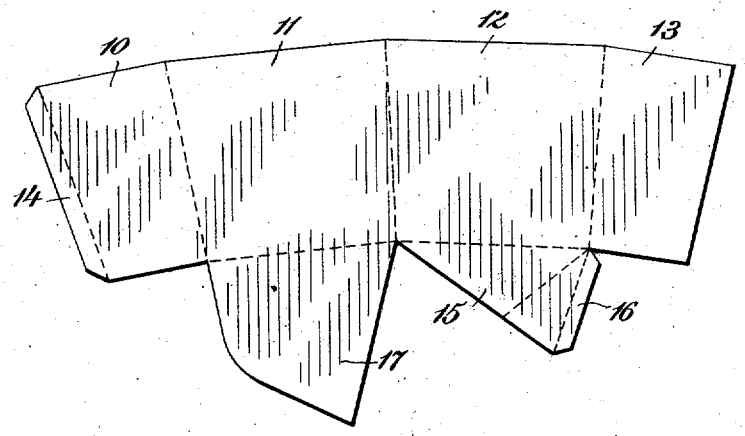
Figure 7:
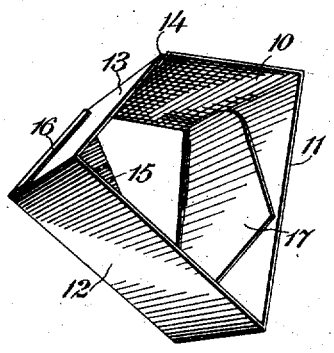

In the accompanying drawings, Figure 1 represents a blank formed and scored upon lines suitable for constructing my improved box: Fig. 2 represents a perspective view of a box made from the blank shown in Fig. 1 with the parts in position for use: Fig. 3 represents a top plan view of the box shown in Fig. 2 with the bottom partially raised; Fig. 4 is a top plan view representing an intermediate position of the box in process of collapsing: Fig. 5 represents a perspective view of the collapsed or folded box: Fig. 6 represents a blank formed and scored upon lines suitable for providing a modified construction of the box: Fig. 7 is a perspective view representing the box made from the blank shown in Fig. 6 with the bottom raised: and Fig. 8 is a perspective view of the box made from the blank shown in Fig. 6 with the bottom down.

As shown in Figs. 1 to 5 of the drawings, the box may be formed of a blank comprising the sections 1, 2, 3, and 4 defined by the respective scores 1′, 2′, 3′, and 4′ along which creases are made to form the sides of the box, an end section as 1 having a lap 5 folded along the adjacent score and glued to the section 4 thereby closing the sides. The similar sides 1 and 2 have thereon the respective parts 6 and 7 joined thereto on the lines of the scores 6′ and 7′ along which creases are made, the part 7 being provided with the score 7″ along which a crease is made to permit this part to be folded on this line. On the part 7 is a lap 8 folded along the score line 8′, the lap being glued to the bottom of the side section 3 so that the part 7 forms a bottom support. On the part 6 is the lap 9 folding on the score line 9′, this lap engaging the side section 4 loosely or by means of a suitable adhesive when the section 6 forming the bottom is folded upon the supporting section 7. The box thus formed is collapsed by folding in the lap 9, raising the bottom 6 and folding inwardly the bottom supporting section 7 and the side sections 3 and 4, the several positions being shown successively in Figs. 2, 3, 4, and 5.

Figure 8:
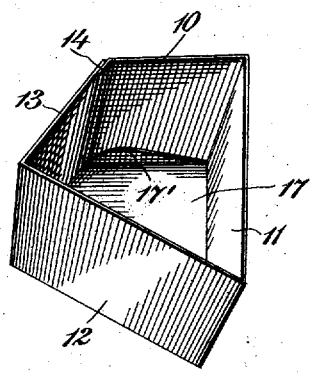

In Figs. 6, 7 and 8 there is shown one of the various ways in which the blank and box can be modified within the scope of the invention. In this construction the side sections 10, 11, 12 and 13 are joined together by a lap 14 on the section 10 which is glued to the section 13, the bottom part or section 15 formed integrally with the side 12 having the lap 16 which is glued to the side 13 to provide a support for the bottom 17 formed integrally with the side 11. The bottom is made so that when raised it will lie flat against the side 11 without folding or bending any of its parts while when pressed down its edge 17′ is pressed against the side section 10 and may be turned up by contact therewith without breaking or creasing, the wedging action providing a tightly fitting snug bottom.

It will be observed that the foregoing improvements provide a box from a single blank or unitary sheet with but two essential laps fixed to form joints and without crease or break in the bottom, the construction being such that the parts or sections fold together in parallel relation to a quadrilateral form having the area of a single side and expand from the initial folded relation without breaking or creasing to form the parts as is required by the usual constructions.

Having described my invention, I claim:—

1. A collapsible box having four unbroken sides, a creased bottom part secured to two sides and a bottom part secured to a third side only and supported by said first part, said parts being joined by flexible connections permitting them to fold together in parallel relation substantially within the compass of a single side.

2. A collapsible box formed from a single blank with four unbroken sides, but two essential laps fixed to form joints, an unbroken bottom fixed to a single side and an infolding bottom section fixed to two sides to support said bottom, the parts of said box being joined in flexible relation permitting them to be folded together.

3. A collapsible box having a one piece folding bottom section fixed to two sides and an unbroken folding bottom fixed to an unbroken third side only, said bottom being supported by said bottom section when said box is expanded.

4. A collapsible four sided box having a broken folding bottom section fixed to two sides and an unbroken folding bottom fixed to a third side, said bottom having a part adapted for forming a lapping engagement with a fourth side of said box.

5. A collapsible box having four unbroken sides, a broken bottom section secured to two adjacent sides, and an unbroken bottom secured to a third side only and supported by said section.

In testimony whereof I have hereunto set my name this seventh day of January, A. D. 1908, in the presence of the subscribing witnesses.

HENRY TATNALL BROWN.

Witnesses:
WILLIAM F. GILFILLAN,
CHAS. A. MILES.